United States Patent [19]

Przewalski

[11] Patent Number: 4,763,583

[45] Date of Patent: Aug. 16, 1988

[54] SELF-SUSTAINING WET WASTE INCINERATOR

[75] Inventor: Zygmunt J. Przewalski, Granby, Conn.

[73] Assignee: M & S Engineering & Manufacturing Co., Inc., Broad Brook, Conn.

[21] Appl. No.: 1,666

[22] Filed: Jan. 9, 1987

[51] Int. Cl.$^4$ .......................... A47J 36/00; A47J 36/24
[52] U.S. Cl. ................................... 110/246; 110/211; 110/212; 110/214
[58] Field of Search ............... 110/212, 213, 214, 246, 110/346, 226

[56] References Cited

U.S. PATENT DOCUMENTS

| | | | |
|---|---|---|---|
| 3,776,148 | 12/1973 | Hapgood et al. | 110/212 X |
| 4,037,543 | 7/1977 | Angelo | 110/214 |
| 4,254,715 | 3/1981 | Lahaye et al. | 110/214 X |
| 4,350,102 | 9/1982 | Ruegg | 110/246 |

FOREIGN PATENT DOCUMENTS 2435878  2/1975  Fed. Rep. of Germany ...... 110/212

*Primary Examiner*—Edward G. Favors
*Attorney, Agent, or Firm*—Hayes & Reinsmith

[57] ABSTRACT

An apparatus for combusting wet waste or the like comprising ignition means including an ignition chamber having an inlet passageway extending therefrom for introducing the waste, an ignition burner for heating the waste to form non-combustible solids and at least partially combustible flue gases, a first outlet for the flue gases in the wall of the inlet passageway, and a second outlet for the solids; combustion means for substantially combusting the flue gases including a combustion passageway wrapped around the inlet passageway from the ignition chamber first outlet to a combustion chamber, and a combustion burner in the combustion passageway adjacent to the first outlet for aspirating and heating the flue gases; heat recuperating means for transferring heat from the substantially combusted flue gases to preheat an oxygen-containing gas; and passageway means for transferring the pre-heated oxygen-containing gas from the recuperator to the ignition burner and the combustion burner. Also, a method of combusting wet waste comprising the steps of heating the wet waste in an ignition means to partially combust the waste and form non-combustible solids and at least partially combustible flue gases; drawing the flue gases from the ignition means into a combustion means; heating the flue gases in the combustion means to substantially combust the gases; transferring a portion of the heat from the combusted flue gases to an oxygen-containing gas; and injecting the heated oxygen-containing gas into the ignition means and the combustion means to provide the heating therein.

3 Claims, 5 Drawing Sheets

SELF-SUSTAINING WET WASTE INCINERATOR

BACKGROUND OF THE INVENTION

The present invention relates to a method and apparatus for combusting wet waste.

The disposal of wet waste by incineration has traditionally proved to be a problem because of the high costs and especially high fuel costs involved in doing so. As used herein the term "wet waste" refers to that waste material catagorized by the Environmental Protection Administration as Type 4, i.e., combustible waste material having a high content of fire retardant, for example, water or chlorine, and having a low fuel value, averaging approximately 3,000 to 5,000 btus per pound. Such wet waste includes animal remains and body tissue which must be disposed of by hospital research facilities and the like and are especially troublesome.

With regard to animal carcass and the like, the cost of fuel used in a typical incinerator can run to eighty dollars ($80) or more per ton of carcass. This amount of auxilliary fuel is required to burn the waste sufficiently to overcome the fire retarding characteristics of water content in the waste. Such water content can be at least 30 to 50 percent of the mass of the carcass, and in some instances can be up to 70 percent.

In addition to the aforementioned fuel costs, wet waste incinerators also generally require scrubbers et al to control the amount of particulate and other emissions to bring the capacity of these emissions down to a desired level as required by law. "Opacity" as used herein refers to the capacity of off-gas to obstruct the transmission of light, expressed as a percentage. No obstruction is expressed as 0 (zero) percent while total obstruction is expressed as 100 percent. Volatile hydrocarbon soot and other uncombusted particulates are major causes of emissions of high opacity from such incinerators.

Bearing in mind these and other deficiencies of the prior art, it is therefore an object of the present invention to provide an improved method and apparatus for incinerating wet waste.

It is another object of the present invention to provide a wet waste incineration method and apparatus which utilizes significantly less fuel.

It is a further object of the present invention to provide a wet waste incineration method and apparatus which significantly reduces the opacity of off-gas emissions.

It is yet another object of the present invention to provide a wet waste incineration apparatus which is of compact and efficient construction.

Other objects will be in part obvious and in part pointed out in more detail hereinafter.

A better understanding of the objects, advantages, features, properties and relations of the invention will be obtained from the following detailed description and accompanying drawings which set forth an illustrative embodiment and is indicative of the way in which the principle of the invention is employed.

SUMMARY OF THE INVENTION

In one aspect, the present invention provides an apparatus for combusting wet waste or the like comprising ignition means including an ignition chamber having an inlet for the waste, an ignition burner for heating the waste to form non-combustible solids and at least partially combustible flue gases, a first outlet for the flue gases, and a second outlet for the solids; combustion means for substantially combusting the flue gases including a combustion passageway from the ignition chamber first outlet to a combustion chamber, and a combustion burner in the combustion passageway for heating the flue gases; heat recuperating means for transferring heat from the substantially combusted flue gases to preheat an oxygen-containing gas; and passageway means for transferring the pre-heated oxygen-containing gas from the recuperator to the ignition burner and the combustion burner.

In another aspect, the present invention provides a method of combusting wet waste comprising the steps of heating the wet waste in an ignition means to partially combust the waste and form non-combustible solids and at least partially combustible flue gases; drawing the flue gases from the ignition means into a combustion means; heating the flue gases in the combustion means to substantially combust the gases; transferring a portion of the heat from the combusted flue gases to an oxygen-containing gas; and injecting the heated oxygen-containing gas into the ignition means and the combustion means to provide the heating therein.

DETAILED DESCRIPTION OF THE INVENTION

The present invention is useful in incinerating a wide range of wet waste of the aforementioned Type 4 under the EPA classification. In particular, those types of wet waste having a significant fire retardant content, for example, water, in the amount of 30% to 50% or more, may be easily and efficiently incinerated by practice of the present invention.

Figure 1:
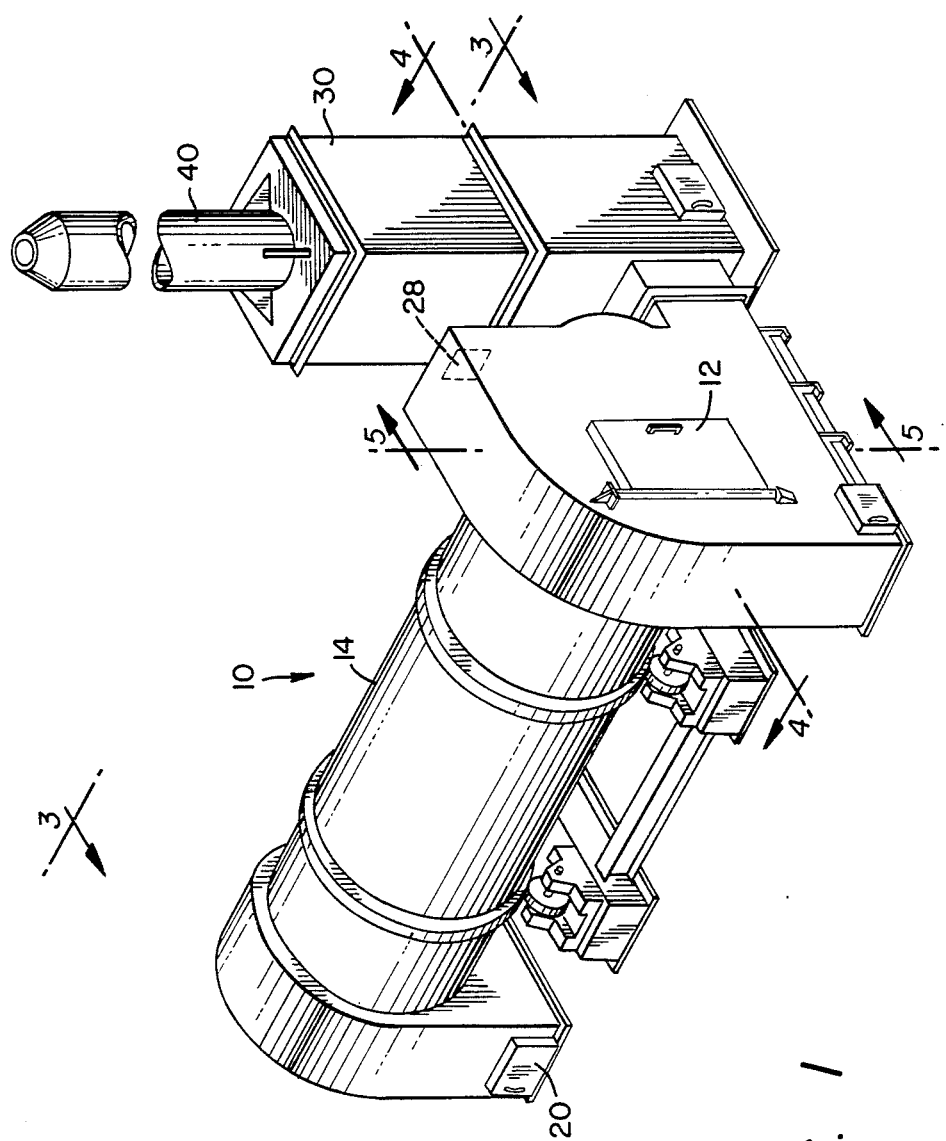
FIG. 1 is a perspective view of the preferred embodiment of the wet waste incinerator of the present invention.
Figure 2:
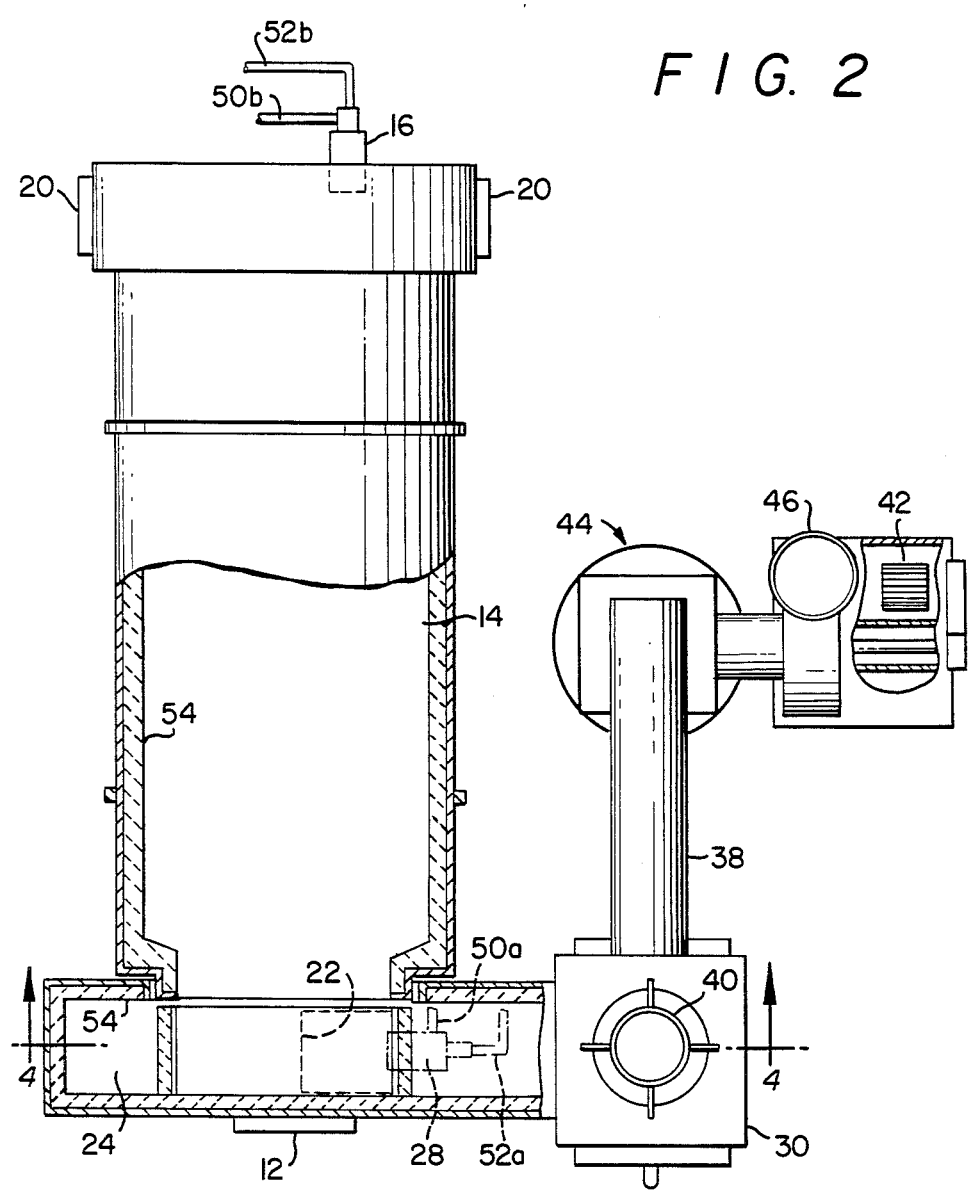
FIG. 2 is a top view, partially in section, of the embodiment of FIG. 1.

In FIGS. 1 and 2 there are shown perspective and top views respectively of the preferred embodiment of the wet waste incinerator 10 of the present invention. A charge door 12 secures a cylindrical inlet passageway 18 leading to ignition chamber 14. A tray 8 is disposed along the bottom of passageway 18 for loading waste into chamber 14. The ignition chamber 14 shown here is a horizontal cylindrical rotary type ignition chamber as disclosed in my U.S. Pat. No. 3,861,335. While static or other types of ignition chambers may be utlized in the practice of the present invention, a rotary type ignition chamber is preferred because of the tumbling action it imparts to the wet waste to effect more complete combustion thereof. An ignition burner 16 is disposed in the end wall of ignition chamber 14 opposite the inlet passageway 18. The ignition burner 16 is the conventional type that utilizes a liquid or gaseous fuel, for example, fuel oil or natural gas and an oxygen-containing gas, for example, air, to ignite the mixture and provide heat to the ignition chamber 14. An access door 20 provides an outlet for combustible solids from the ignition chamber which, with the rotary-type chamber, are continuosly ejected during steady state operation.

Figure 4:
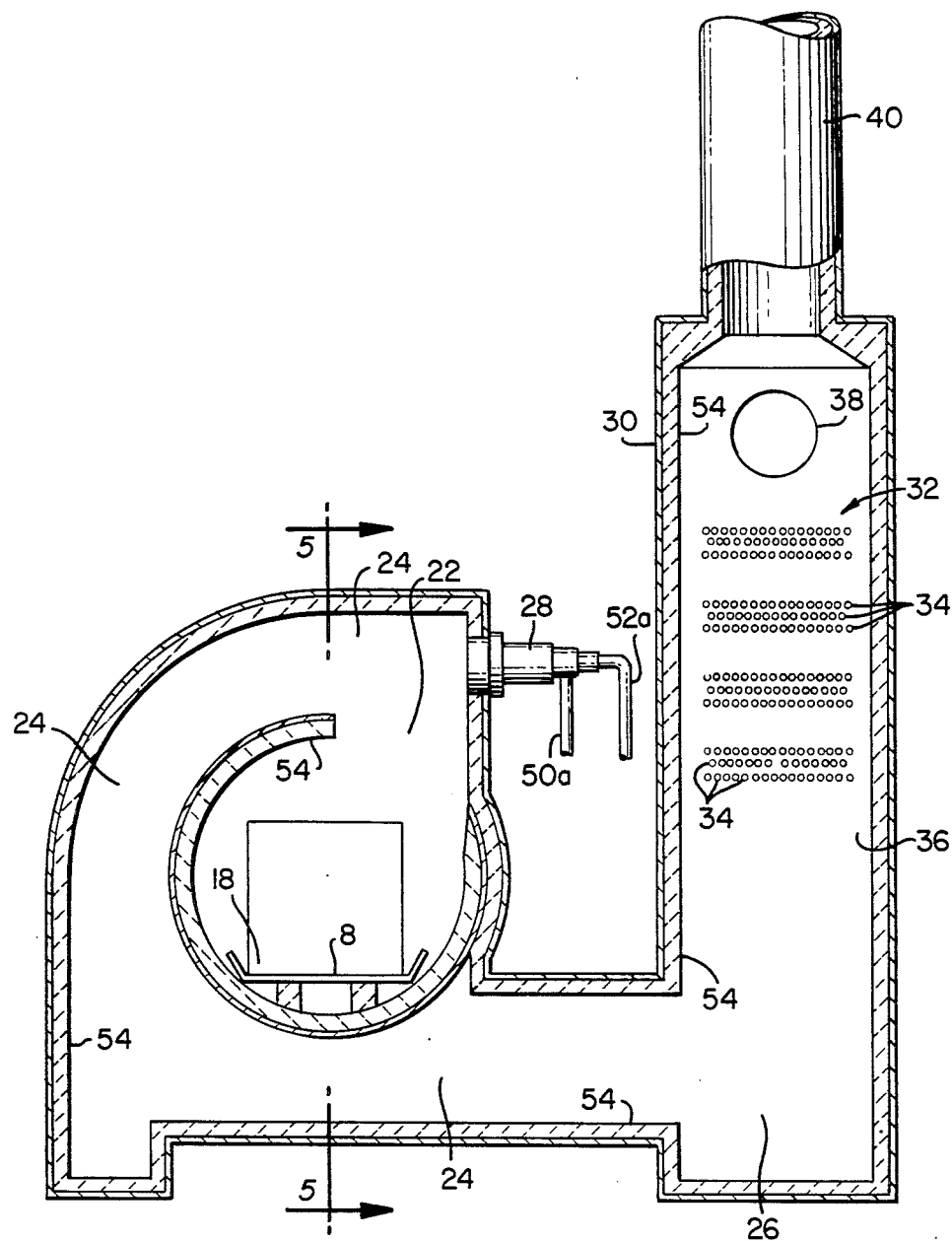
FIG. 4 is a cross-sectional view of the combustion chamber, passageway and heat recuperator of the embodiment of FIG. 1.
Figure 5:
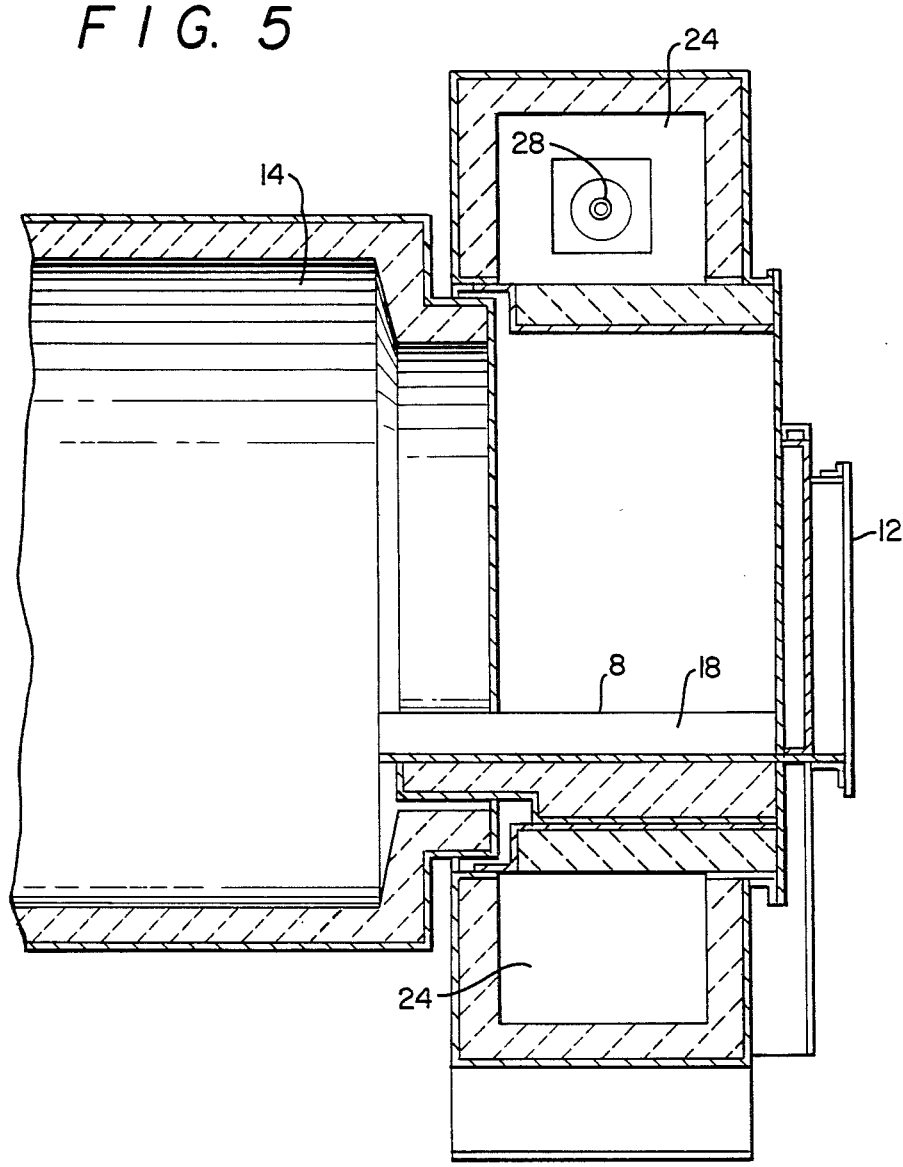
FIG. 5 is a cross-sectional view of the ignition chamber and combustion passageway of the embodiment of FIG. 1.

As shown in FIGS. 1, 2 and 4, flue port 22 is disposed in the upper wall of inlet passageway 18 and serves as an outlet for gases which are created during the wet waste ignition process in the ignition chamber 14. The flue port 22 leads to combustion means which is herein shown as a combustion passageway 24 connected to the flue port 22 and leading to a combustion chamber 26. Combustion passageway 24 is preferably wrapped at least half way around the outside of inlet passageway 18, from the flue port 22 at the passageway 18 upper wall and down beneath the passageway 18 lower wall. An afterburner 28 of the same type as the aforedescribed ignition burner is shown disposed in a wall of the combustion passageway 24 adjacent to flue port 22 for injecting heat into the combustion means.

Figure 3:
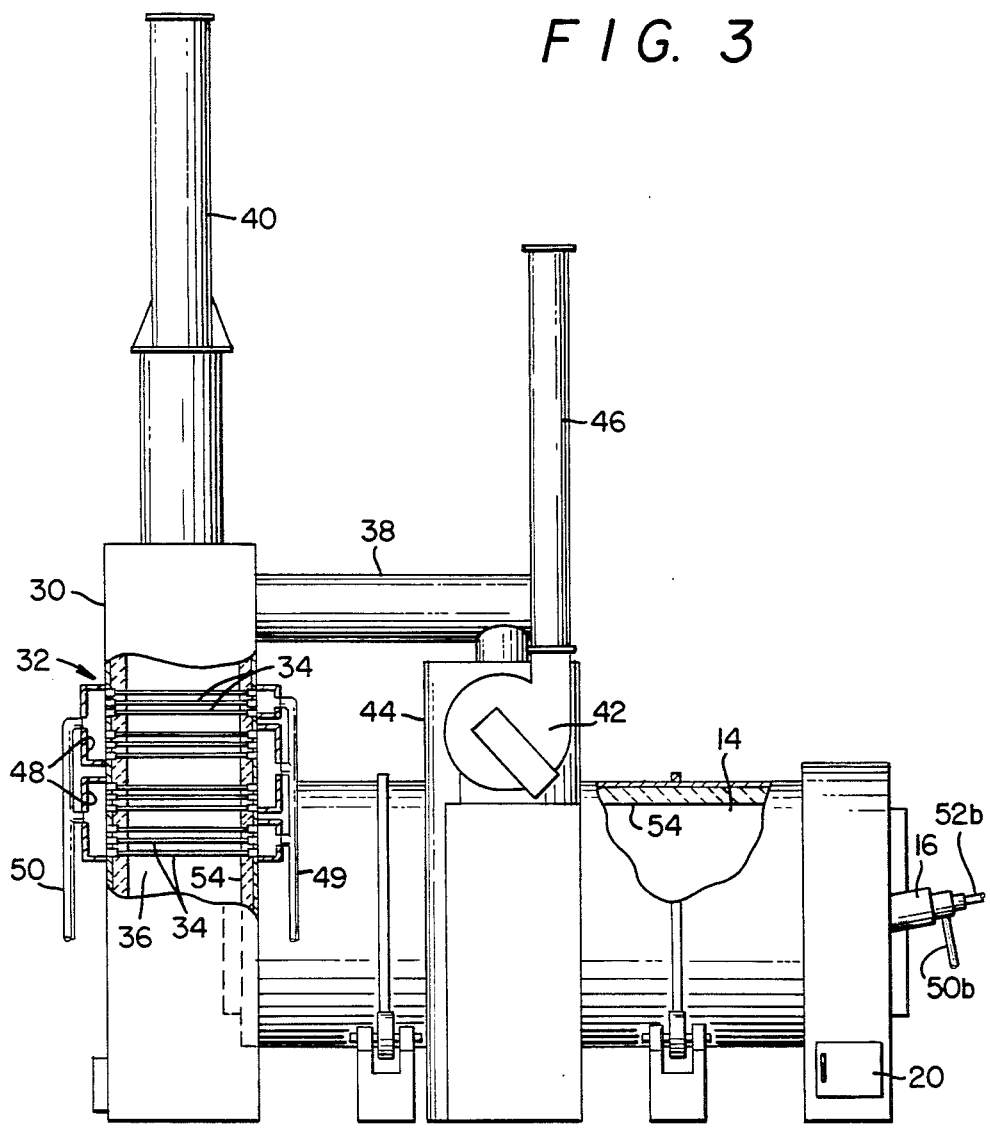
FIG. 3 is a side view, partially in section, of the embodiment of FIG. 1.

The combustion chamber 26 leads to an overhead exhaust stack 30 which includes a waste heat recuperator 32 comprising a plurality of individual alloy tubes 34 traversing an exhaust gas passageway 36 (FIGS. 3 and 4). The exhaust stack passageway 36 leads to a bypass chimney 40 which has a door thereon (not shown) and to a duct 38 leading to pollution abatement equipment 44 for treating the exhaust gas, which equipment may include a conventional scrubber. An exhaust fan 42 is located adjacent to the polution abatement equipment 44 to aid in drawing gases from the ignition chamber 14 and out the exhaust chimney 46.

The air utilized in both the ignition burner 16 and the afterburner 28 is drawn from the atmosphere through conduit 49 and passed through the aforementioned heat recuperator tubes 34 where it may be preheated by heat transferred from the exhaust gases. The waste heat recuperator tubes 34 are connected to a manifold 48 which distributes the air through conduits, 50 50a, 50b which are passageway to the afterburner 28 and ignition burner 16. Fuel for the afterburner and ignition burner is provided through separate conduits 52a and 52b, respectively.

A conventional refractory material 54 lines substantially all the ignition chamber, combustion chamber and exhaust stack wall to provide thermal insulation for the hot waste and gases therein.

In the method of combusting wet waste, the wet waste is charged into the ignition chamber 14 through a charge door 12 and ignition passageway 18. Initially, the ignition burner 16 will supply an ignited mixture of atmospheric ambient temperature air and fuel which serves to bring the ignition chamber up to its operating temperature of between 500° C. and 1,000° C., preferably between 500° C. and 800° C. The air mixed in the ignition burner 16 will initially be at ambient temperature because the exhaust waste heat recuperator will not have been preheated to supply preheated air to the burner.

The preferred operating temperature of the ignition chamber provides that the wet waste placed therein will not be completely combusted. That portion of the wet waste which is completely combusted to a solid ash is continuously ejected through the access door 20. The flue or off-gaases from the wet waste ignition chamber are composed of uncombusted volatiles and partially combusted gases created by combustion of the wet waste. These flue gases pass from the ignition chamber 14 and out through the inlet passageway 18 flue port 22 and into the combustion chamber passageway 24.

As seen best in FIG. 4, the afterburner 28 is positioned adjacent to the flue port 20 so as to assist in drawing the flue gas out of the flue port 22 by the aspirating action of the combusted fuel and air emitted therefrom. The afterburner 28 serves to bring the combustion chamber temperature up to the range of approximately 950° C. to 1,100° C. Again, during the initial start up of the apparatus, the afterburner 28 will inject an ignited mixture of fuel and ambient temperature atmospheric air.

The flue gases are mixed in the combustion passageway 24 and chamber 26 and heated by the afterburner 28 to effect substantially complete combustion of the volatiles and other gases contained therein. The combusted flue gases then pass from the combustion chamber 26 through the waste heat recuperator 32 and heat the alloy tubes 34 passing therethrough. After passing through the waste heat recuperator 32, the flue gases travel either to the polution abatement equipment 44 or directly to the atmosphere via the bypass chimney 40.

In the initial start up of the apparatus shown here, the recuperator tubes will be at ambient temperature. However, upon being exposed to the approximately 1,000° C. combustion chamber gases, the tubes will themselves become heated. Atmospheric air passing through theses tubes and on to the ignition burner 16 and afterburner 28 will become heated, preferably to the temperature range of 450° C. to 500° C.

As the air to both the ignition burner 16 and afterburner 28 becomes preheated to the 500° C. temperature range the amount of fuel ejected through the burners may be progessively diminished until no fuel at all is supplied to these burners. The heat and oxygen of the preheated air flow through burners 16 and 28 are sufficent to effect auto-combustion of the wet waste and its off-gases. In the preferred operation of the apparatus shown herein, the major portion of the preheated air from the waste heat recuperator will be passed to the ignition burner 16 and only a minor portion will be passed to afterburner 28. The preferred ratio of preheated air distribution is approximately 70% to the ignition burner and approximately 30% to the combustion afterburner.

Upon reaching the steady state condition where only preheated air and no fuel is supplied to the ignition and afterburners, the heat of combustion supplied by the wet waste will be sufficient to sustain the combustion process. Thus, for the aforedescribed wet waste having a substantial water content of 30 to 50 percent and higher, and a fuel value of 3,000 to 5,000 btus per pound, the process may be operated at a steady state without additional fuel input.

In addition, the combustion of flue gases may be so complete that the polution abatement equipment 44 may not need to be utilized, and the combusted flue gases may be exhausted directly to the atmosphere by the bypass chimney 40.

Several features of the apparatus shown in FIGS. 1-5 are of particular advantage. As shown in FIG. 4, the inlet passageway 18 to the ignition chamber 14 comprises a tubular refractory lined passageway. The combustion passageway 24 is wrapped substantially around the exterior of cylindrical inlet passageway 18 preferably, more than 180° degrees as shown in FIG. 4. The location of the afterburner 28 directly adjacent to the flue port 22 and over the combustion passageway 24 assists in aspirating the flue gases from the ignition chamber 14 through the flue port 22. The wrap-around construction of the combustion passageway 24 aids in the aspiration and also in mixing the flue gases coming therefrom. While a separate combustion chamber is shown in FIG. 4, it should be understood that combustion of the flue gases also takes place in the combustion passageway. The wrap-around construction of the combustion passageway also enables the entire apparatus to be more compact so that a substantial combustion passageway length may be provided while allowing the combustion chamber 26 and waste heat recuperator 32 to be closely adjacent to the ignition chamber 14 apparatus. The high degree of mixing and combustion which occurs in the wrap-around combustion passageway 24 and combustion chamber 26 also permits a smaller waste heat recuperator to be utilized.

EXAMPLE

An apparatus as shown in FIGS. 1-5 was constructed to combust and dispose of wet waste comprising animal carcasses, body tissue, and other wet waste materials. The carcasses were supplied to the apparatus in frozen form. The furnace capacity was constructed to consume approximately 500 pounds per hour of animal waste or about 350 pounds per hour of other wet hospital waste. The apparatus took approximately ½ hour for preheating, during which time fuel oil was combusted in the ignition burner and afterburner to supply heat to the ignition chamber and combustion chamber, respectively. After the apparatus reached its normal operating temperatures of about 800° C. for the ignition chamber and approximately 1,000° C. for the combustion chamber, and when the preheated air from the waste heat recuperator reached a temperature of about 500° C., the fuel to the after and ignition burners was shut off. Wet waste was continuously supplied to the ignition chamber at the rate of betwen 350 and 500 pounds per hour and the apparatus continued to operate without additional fuel input. At the aforementioned steady state temperatures the opacity of the combusted flue gases was approximately 0% and the gases were able to be exhausted directly through the bypass chimney to the atmosphere and the scrubber in the polution statement apparatus was deactivated.

The furnace continued to operate for several hours at the steady state condition described above. When the flow of wet waste to the ignition chamber was stopped, the apparatus took a period of approximately ½ hours for shut-down, during which time fuel was added to the afterburners and combusted with the air coming therethrough until the waste in the ignition chamber was substantially combusted. At that time the apparatus was shut down.

The amount of air consumed during steady state operations by the afterburners was approximately 6 cubic meters per minute at standard conditions and by the ignition burner was approximately 14 cubic meters per minute at standard conditions.

Thus, as can be seen above the method and apparatus of the present invention provides a highly efficient low cost, non-polluting method of combusting wet waste. The cost of additional fuel utilized to combust these wet waste is only reflected in the preheat and shut down periods. Therefore, the longer the apparatus is made to operate at steady state conditions, the more efficient it will be.

As will be apparent to persons skilled in the art, various modifications, adaptions and variations of the foregoing specific disclosure can be made without departing from the teaching of this invention.

Having thus described the invention what is claimed is:

1. Apparatus for combusting wet waste or the like comprising:
   ignition means including a substantially horizontally disposed ignition chamber having an inlet passageway extending therefrom for introducing said waste, an ignition burner for heating said waste to form non-combustible solids and at least partially combustible flue gases, a first outlet for said flue gases in the wall of said inlet passageway, and a second outlet for said solids;
   combustion means for substantially combusting said flue gases including a combustion passageway from said ignition chamber first outlet to a combustion chamber, said combustion passageway being disposed adjacent to and wrapped around a portion of said ignition chamber inlet; and
   combustion burner in said combustion passageway adjacent to said first outlet for aspriating and heating said flue gases;
   heat recuperating means for transferring heat from the substantially combusted flue gases to preheat an oxygen-containing gas; and
   passageway means for transferring the preheated oxygen-containing gas from said recuperator to said ignition burner and said combustion burner.

2. The apparatus of claim 1 wherein said recuperator comprises a passageway for hot, substantially combusted flue gas and a plurality of tubes disposed in said passageway for heating and transporting said oxygen-containing gas.

3. The apparatus of claim 1 wherein said ignition means includes a rotary ignition chamber.

* * * * *